US011265480B2

(12) United States Patent
Segapelli et al.

(10) Patent No.: US 11,265,480 B2
(45) Date of Patent: Mar. 1, 2022

(54) SYSTEMS AND METHODS FOR CONTROLLING EXPOSURE SETTINGS BASED ON MOTION CHARACTERISTICS ASSOCIATED WITH AN IMAGE SENSOR

(71) Applicant: QUALCOMM Incorporated, San Diego, CA (US)

(72) Inventors: Loic Francois Segapelli, San Diego, CA (US); Wenbin Wang, San Diego, CA (US); Zuguang Xiao, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/438,359

(22) Filed: Jun. 11, 2019

(65) Prior Publication Data
US 2020/0396367 A1    Dec. 17, 2020

(51) Int. Cl.
*H04N 5/235* (2006.01)
(52) U.S. Cl.
CPC ................. *H04N 5/2353* (2013.01)
(58) Field of Classification Search
CPC ............ H04N 5/2353; H04N 5/23254; G06K 9/2054; G06K 9/78; G06K 9/00791; G06K 2209/23; G06K 9/00664; G06K 9/00798; G06K 9/00805; G06K 9/00818; G06K 9/6256; B60R 1/00; G01C 21/30; G01S 13/06; G01S 13/867; G01S 19/48; G05D 1/0246; G06T 1/0007; G06T 2207/30256; G06T 7/11; G08G 1/0962; G08G 1/166; G08G 1/167
See application file for complete search history.

(56) References Cited

U.S. PATENT DOCUMENTS

| | | | |
|---|---|---|---|
| 5,475,466 A * | 12/1995 | Iwasaki | G01S 3/7864 348/E5.042 |
| 9,060,135 B2 * | 6/2015 | Akiba | H04N 5/2251 |
| 10,586,121 B2 * | 3/2020 | Murillo Amaya | G06K 9/00825 |
| 10,708,510 B2 * | 7/2020 | Oh | H04N 5/23254 |
| 2007/0058048 A1 | 3/2007 | Kinugasa et al. | |
| 2012/0162424 A1 * | 6/2012 | Murao | G06K 9/2054 348/148 |
| 2012/0170839 A1 * | 7/2012 | Yuan | H04N 9/735 382/165 |

(Continued)

OTHER PUBLICATIONS

International Search Report and Written Opinion—PCT/US2020/036815—ISA/EPO—dated Aug. 25, 2020.

*Primary Examiner* — Chiawei Chen
(74) *Attorney, Agent, or Firm* — Polsinelli LLP

(57) ABSTRACT

Systems and methods for processing one or more images include determining one or more current exposure settings for a current image of a current scene at a current time. One or more motion characteristics associated with an image sensor are determined. Based on the one or more motion characteristics, a location of a portion of the current image to use for determining one or more future exposure settings for the image sensor are determined, the one or more future exposure settings for capturing a future image of a future scene at a future time, the future time being subsequent to the current time. The one or more future exposure settings are determined based on the predicted portion of the current image.

42 Claims, 9 Drawing Sheets

(56) References Cited

U.S. PATENT DOCUMENTS

| | | | | |
|---|---|---|---|---|
| 2012/0242851 A1* | 9/2012 | Fintel | ................ | H04N 5/772 |
| | | | | 348/221.1 |
| 2012/0243802 A1* | 9/2012 | Fintel | ................ | H04N 5/2625 |
| | | | | 382/284 |
| 2012/0257071 A1* | 10/2012 | Prentice | ............ | H04N 5/23238 |
| | | | | 348/220.1 |
| 2012/0312960 A1* | 12/2012 | Mine | ................ | H04N 5/347 |
| | | | | 250/206 |
| 2014/0204267 A1* | 7/2014 | Akiba | ................ | B60R 1/00 |
| | | | | 348/362 |
| 2015/0029357 A1 | 1/2015 | Hamalainen | | |
| 2015/0222800 A1* | 8/2015 | Hirooka | ............ | H04N 5/2353 |
| | | | | 348/364 |
| 2015/0378015 A1* | 12/2015 | You | ............ | G01S 19/48 |
| | | | | 701/469 |
| 2016/0117848 A1* | 4/2016 | Hattori | ................ | G06K 9/38 |
| | | | | 382/103 |
| 2018/0054559 A1* | 2/2018 | Welker | ................ | H04N 5/2352 |
| 2018/0059360 A1* | 3/2018 | Omata | ................ | G03B 13/36 |
| 2018/0060675 A1* | 3/2018 | Ji | ................ | G05D 1/0246 |
| 2018/0197022 A1* | 7/2018 | Fujikawa | ................ | H04N 5/33 |
| 2018/0241927 A1* | 8/2018 | Chen | ................ | H04N 9/045 |
| 2018/0247139 A1* | 8/2018 | Kaneko | ................ | G08G 1/167 |
| 2019/0057262 A1* | 2/2019 | Sai | ................ | G08G 1/166 |
| 2019/0186931 A1* | 6/2019 | Dittmer | ................ | G01C 21/3461 |
| 2019/0208111 A1* | 7/2019 | Wendel | ................ | H04N 5/238 |
| 2020/0012097 A1* | 1/2020 | Kubota | ................ | G09G 5/38 |
| 2020/0086879 A1* | 3/2020 | Lakshmi Narayanan | ................ | |
| | | | | G06N 3/0445 |
| 2020/0128165 A1* | 4/2020 | Fendt | ................ | B60R 11/04 |
| 2020/0200545 A1* | 6/2020 | Wappler | ............ | G06K 9/00664 |

* cited by examiner

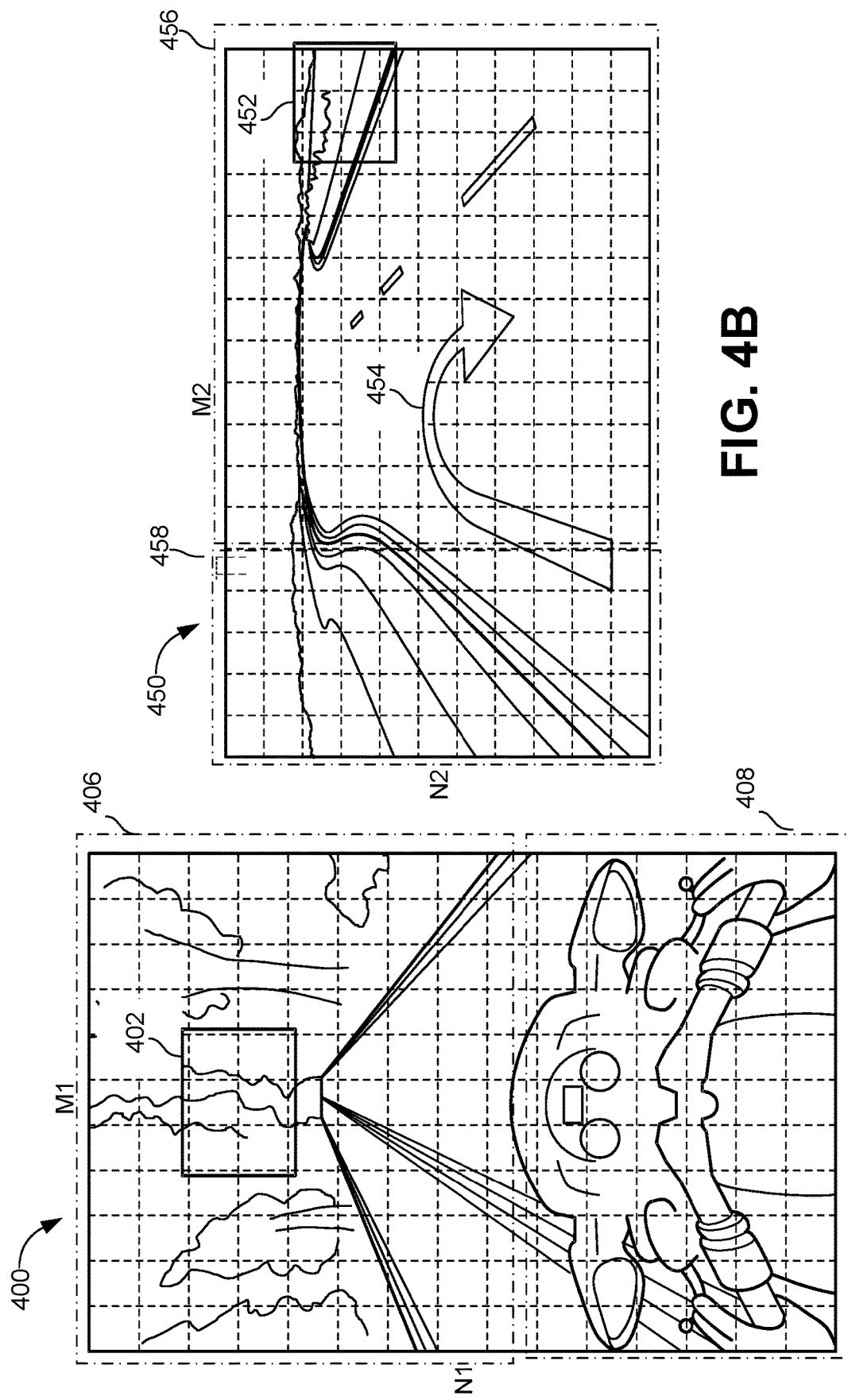

SYSTEMS AND METHODS FOR CONTROLLING EXPOSURE SETTINGS BASED ON MOTION CHARACTERISTICS ASSOCIATED WITH AN IMAGE SENSOR

FIELD

The present disclosure generally relates to techniques and systems for controlling auto exposure of an image. More specifically, example aspects are directed to controlling exposure of an image based on motion characteristics associated with an image sensor.

BACKGROUND

In photography, exposure of an image captured by a camera refers to the amount of light per unit area which reaches a photographic film, or in modern cameras, an electronic image sensor. The exposure is based on camera settings, such as shutter speed and lens aperture, as well as the luminance of the scene being photographed. Many cameras are equipped with an automatic exposure or "auto exposure" mode, where the exposure settings (e.g., shutter speed, lens aperture, etc.) may be automatically adjusted to match, as closely as possible, the luminance of the scene or subject being photographed.

The calculation of exposure settings may incur processing delays. For example, a processing delay may be involved from the time that calculations for exposure settings for an image are initiated to the time when the exposure settings are applied to the camera for capturing the image. This processing delay may be unacceptably high in some situations.

SUMMARY

In some examples, techniques and systems are described for processing one or more images. Some examples include determining one or more current exposure settings for a current image of a current scene to be captured at a current time by a camera or image sensor. One or more motion characteristics associated with an image sensor can be determined. The one or more motion characteristics can include one or more of a speed or a direction of travel of the image sensor. In some examples, the one or more motion characteristics of the image sensor can be determined based at least in part on one or more of an inertial sensor or input to a steering system in communication with the image sensor. In some examples, determining the one or more motion characteristics can be based at least in part on one or more regions of interest of the current image. Based on the one or more motion characteristics, a location of a portion of the current image to use for determining one or more future exposure settings for the image sensor can be predicted. The one or more future exposure settings, which can be used for capturing a future image of a future scene at a future time, can be determined based on the predicted portion of the current image. In some examples, the future time is subsequent to the current time. In some examples, the one or more future exposure settings can be determined before a field of view of the image sensor reaches the future scene. This way, the future exposure settings can be ready and available once the field of view of the image sensor reaches or includes the future scene, thus enabling the processing of the future image to be expedited.

According to at least one example, a method of processing one or more images is provided. The method includes determining one or more current exposure settings for a current image of a current scene at a current time. The method further includes determining one or more motion characteristics associated with an image sensor. The method further includes predicting, based on the one or more motion characteristics, a location of a portion of the current image to use for determining one or more future exposure settings for the image sensor, the one or more future exposure settings for capturing a future image of a future scene at a future time, the future time being subsequent to the current time. The method further includes determining the one or more future exposure settings based on the predicted portion of the current image.

In another example, an apparatus for processing one or more images is provided that includes a memory configured to store the one or more images, and a processor coupled to the memory. The processor is implemented in circuitry and configured to and can determine one or more current exposure settings for a current image of a current scene at a current time. The processor is further configured to and can determine one or more motion characteristics associated with an image sensor. The processor is further configured to and can predict, based on the one or more motion characteristics, a location of a portion of the current image to use for determining one or more future exposure settings for the image sensor, the one or more future exposure settings for capturing a future image of a future scene at a future time, the future time being subsequent to the current time. The processor is further configured to and can determine the one or more future exposure settings based on the predicted portion of the current image.

In another example, a non-transitory computer-readable medium is provided that has stored thereon instructions that, when executed by one or more processors, cause the one or more processor to: determine one or more current exposure settings for a current image of a current scene at a current time; determine one or more motion characteristics associated with an image sensor; predict, based on the one or more motion characteristics, a location of a portion of the current image to use for determining one or more future exposure settings for the image sensor, the one or more future exposure settings for capturing a future image of a future scene at a future time, the future time being subsequent to the current time; and determine the one or more future exposure settings based on the predicted portion of the current imago.

In another example, an apparatus for processing one or more images is provided. The apparatus includes means for determining one or more current exposure settings for a current image of a current scene at a current time. The apparatus further includes means for determining one or more motion characteristics associated with an image sensor. The apparatus further includes means for predicting, based on the one or more motion characteristics, a location of a portion of the current image to use for determining one or more future exposure settings for the image sensor, the one or more future exposure settings for capturing a future image of a future scene at a future time, the future time being subsequent to the current time. The apparatus further includes means for determining the one or more future exposure settings based on the predicted portion of the current image.

In some aspects, the methods, apparatuses, and computer-readable medium described above further comprise determining the one or more future exposure settings before a field of view of the image sensor reaches the future scene.

In some aspects of the methods, apparatuses, and computer-readable medium described above, predicting the location of the portion of the current image to use for determining the one or more future exposure settings includes excluding a region of the current image from being used for determining the one or more future exposure settings.

In some aspects of the methods, apparatuses, and computer-readable medium described above, the one or more motion characteristics include one or more of a speed or a direction of travel of the image sensor.

In some aspects, the methods, apparatuses, and computer-readable medium described above further include determining the one or more motion characteristics based at least in part on one or more of an inertial sensor or input to a steering system in communication with the image sensor.

In some aspects, the methods, apparatuses, and computer-readable medium described above further include determining the one or more motion characteristics based at least in part on one or more regions of interest of the current image.

In some aspects of the methods, apparatuses, and computer-readable medium described above, determining the one or more future exposure settings based on the predicted portion of the current image includes predicting one or more regions of interest of the future image in the predicted portion, and adjusting exposure settings for the one or more regions of interest.

In some aspects, the methods, apparatuses, and computer-readable medium described above further include determining a grid comprising one or more grid elements associated with one or more regions of the future image in the predicted portion, and determining weights for the one or more grid elements, wherein the one or more future exposure settings are based on the weights.

In some aspects of the methods, apparatuses, and computer-readable medium described above, the one or more future exposure settings include a variation in one or more current exposure settings of the current image.

In some aspects, the methods, apparatuses, and computer-readable medium described above further include capturing the future image by the image sensor, based on the one or more future exposure settings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 4A-FIG. 4B illustrate schematic views of grids for processing an image based on one or more motion characteristics associated with a camera and one or more regions of interest, according to this disclosure.

DETAILED DESCRIPTION

Figure 1:
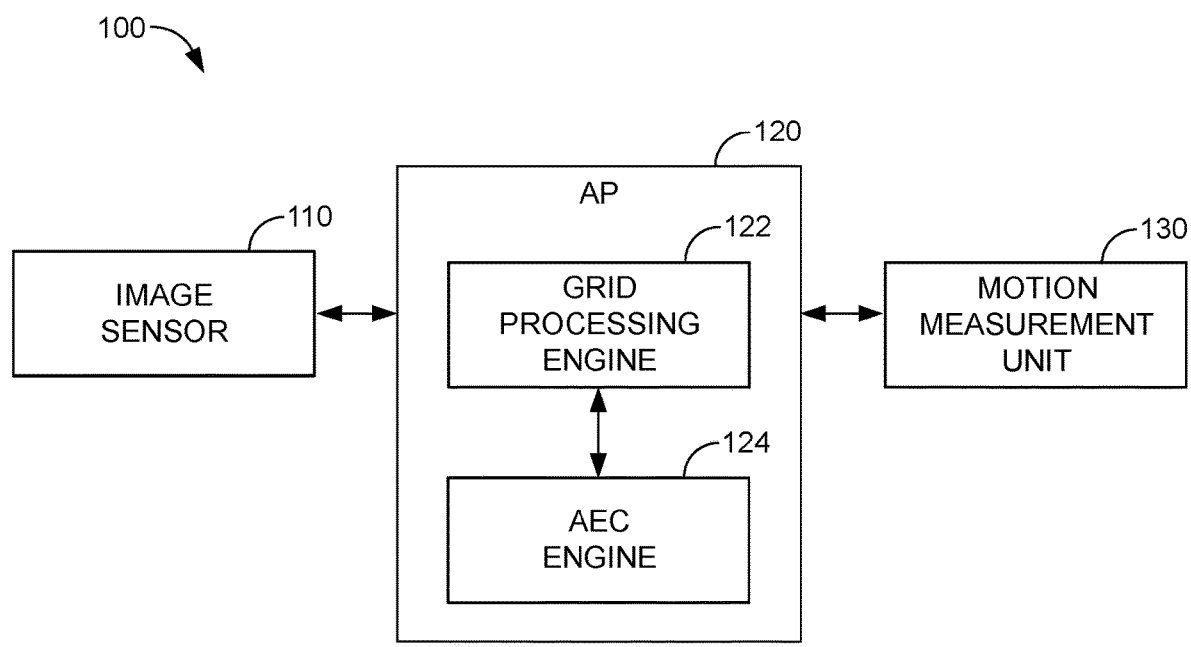
FIG. 1 is a block diagram illustrating an example image processing system, according to this disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera may include mechanisms for calculating the appropriate exposure settings for images captured by the camera. In some examples, the exposure settings of the camera may be dynamically adjusted. For example, the exposure settings can include settings for an aperture of the camera's lens. In some examples, exposure settings can also include settings for sensitivity or gain of the camera, which may be based on standards, such as an international standards organization (ISO) defined sensitivity, also known as an ISO sensitivity. The exposure settings for the aperture and shutter speed can control the amount of time an image of a scene is exposed to the camera's image sensors, for example. The exposure settings for the aperture and speed may also be referred to as exposure settings for exposure time.

A camera's shutter speed and aperture can control the amount of light that enters the camera. In some examples, an electronic sensor in the camera can detect light reflected from a scene, where a measure of the reflected light can be used to adjust the exposure settings of an image of the scene captured by the camera. Measuring the reflected light is also referred to as light metering.

In some conventional light metering mechanisms, (also known as metering modes or metering systems) exposure settings for an entire image may be calculated based on an "assumption" (e.g., a determination made without performing a real-time computation or analysis to make the determination) of the amount of reflectivity of a default scene. In some examples, a metering mode may assume that a scene has a reflectivity of a predetermined percentage (e.g., approximately 18% in some known implementations) and may calculate the exposure accordingly. In some examples, an average metering mode may be utilized where the intensity of reflected light from approximately the entire field of view of the camera may be summed and averaged, with the average intensity used for controlling the exposure settings for the camera. While these metering modes may be suitable in some situations (e.g., a static camera used to capture images of a scene which does not include very bright or very dark backdrops), these metering modes may not be effective in preventing disproportionally bright or dark areas of a scene from adversely impacting the exposure of the entire scene.

For example, relying on such assumptions of predetermined percentage reflectivity or average metering may be unsuitable for scenes with a large proportion of highly reflective surfaces and can lead to undesirable outcomes. For example, a scene with a backdrop of snow, large expanses of water, bright light sources, etc., can lead to images of the scene being underexposed. Examples of such underexposed images may be seen in pictures of snow scapes where the snow is depicted with a cool blue color instead of a more realistic bright white appearance. Similarly, scenes with a large proportion of non-reflective surfaces or darker backgrounds (e.g., a night time or dimly lit scene or a dark backdrop) can lead to overexposed images of the scene.

In some examples, a brightness range of light from a scene may significantly exceed the brightness levels that the image sensor can capture. For example, a digital single-lens reflex (DSLR) camera may be able to capture a 1:30,000 contrast ratio of light from a scene while the brightness levels of a high dynamic range (HDR) scene can exceed a 1:1,000,000 contrast ratio. In some cases, HDR sensors may be utilized to enhance the contrast ration of an image captured by a camera. In some examples, HDR sensors may be used to obtain multiple exposures within one image or frame. In some examples, HDR sensors may be used to obtain multiple exposures across multiple frames, where such multiple exposures can include short, medium and long exposures. However, spatial or temporal artifacts may limit the effectiveness of using such HDR sensors to obtain appropriate light metering for a scene. For example, some scenes may not need multiple exposures, and so the use of the multiple exposures may be wasteful.

Accordingly, some metering modes attempt to reduce the impact of disproportionally bright or dark regions of the scene and set the proper amount of exposure for the various regions of an image within a field of view of the camera. In some examples, the metering modes may be used to control the exposure settings to avoid unnecessary use of multiple exposures for scenes which do not have artifacts of high contrast ratios. In some examples, such metering modes may use weight-based techniques for weighting brightness levels of different regions of the image to be captured. For example, one or more weights may be associated with a region of the image, where exposure settings for the region may be based on the one or more weights associated with the region. In some examples, using the one or more weights to weight brightness levels of the region more heavily may lead to a first type of exposure settings for the region, while weighting the brightness levels for the region less heavily may lead to a second type of exposure settings. In some examples, the first type of exposure settings can include a higher or heavier exposure setting, while the second type of exposure settings can include a lower or lighter exposure setting. In some examples, the weight-based metering modes may include a predetermined pattern such as a grid to determine exposure settings for regions of an image to be captured. For example, grid elements of the grid can correspond to exposure settings for the different regions of the image. The weight-based metering modes can include weights for grid elements, where the weights may be used to control the exposure settings for the corresponding regions of the image. In some cases, the weight-based metering modes may also be referred to as grid metering. Various types of grid metering can be used, such as center-weighted metering, spot metering, matrix metering, etc.

In center-weighted metering, an increased emphasis or weighting is applied to grid elements which are closest to the center of the image to be captured by the camera. The center-weighted metering operates on the assumption that an object of interest may be at the center of the camera's field of view, and the most accurate exposure settings may be desired for the object of interest. As can be appreciated, this assumption may not be true and/or may not be sustainable in some situations. For example, if there are more than one object of interest in a scene and/or if one or more objects are in motion while the camera is fixed (e.g., in a surveillance camera located in a fixed position), and/or if the camera is also in motion, then the exposure settings based on the center-weighted metering may not provide the appropriate exposure settings for grid elements in different regions of an image.

Spot metering is similar to the center-weighted metering, but in the spot metering, the emphasis may be on a spot or a region of an image to be captured, where the spot need not be the center of the image. For example, before composing the final scene, the spot metering may place weighted emphasis on an off-center location of an image by tailoring exposure settings to the off-center location of the image. The spot metering may also be unsuitable in various situations for similar reasons as the center-weighted metering.

Matrix metering may adaptively adjust weights for the different grid elements based on different algorithms. The matrix weight metering may provide fine-tuned exposure settings in a distributed manner across grid elements in the various regions of the image, without being limited to the center or a spot, as discussed with reference to center-weighted metering and spot metering. However, the matrix metering may involve significant computational efforts in calculating and recalculating the weights for the grid elements in the various regions, where these computations may incur processing delays.

In some examples, the scene viewed by a camera (e.g., a field of view detected and captured by an image sensor of an image capture device, for example, a camera) may change from one moment to another. In some examples, the camera may capture images of different scenes, for example, at different time instances. In some examples, the camera may capture a series of still images of different scenes or the same scene. Further, the camera may include a video mode to capture a video comprising a sequence of images across the different scenes or of the same scene. In some examples, the exposure settings for the camera may also need to be changed for the images to be captured of the different scenes. For instance, in a weight-based metering mode which is utilized to control the exposure settings, the weights may need to be changed from a current image of a current scene at a current time to a future image of a future scene at a future time, where the scenes may change from the current scene to the future scene after a lapse of time from the current time to the future time, with the future time being subsequent to the current time. Calculating and recalculating the weights (e.g., in the various above-discussed grid metering modes) to keep up with the scene changes incurs processing times. These processing times may vary based on the grid metering modes as noted above. While the processing times may not be of concern when the transition from the current scene to the future scene is gradual or the lapse of time is greater, rapid changes between the scenes where the lapse of time is smaller may pose a challenge.

In some situations, movement of objects in the scenes viewed of the camera can trigger a need to readjust exposure settings. In an illustrative example, a moving car may be within the scene viewed by the camera while the camera is relatively still or stationary. In these situations, various analytical tools can be used to recalculate weights to adjust exposure settings as new images such as the moving car come into the view of the camera. For example, predictive algorithms may be used in the various grid metering modes to calculate the weights or to expedite the recalculation of the weights to be suitable for the new images.

In some situations, the scene viewed by the camera may change based at least in part due to movement of the camera itself. For example, a moving camera may be used to capture a still image, or there may be movement in both the camera and the objects in the scene viewed by the camera causing relative movement. An illustrative example of the camera being in motion may involve a sweeping motion of the camera held by a user, from left to right, to capture a panoramic view of natural scenery. An illustrative example of both the camera and the objects being in motion may involve the camera being placed on a moving vehicle while capturing images of another moving vehicle.

For these situations in which the camera itself may be in motion, the conventional analytical tools used by the weight-based metering modes for calculating and recalculating the weights may be ineffective. The conventional grid metering modes are not well suited to take into account any movement in the camera itself when predicting weights for future images. This is because the motion characteristics (e.g., direction, velocity, etc.) of the camera may not be known or predictable by conventional systems. Therefore, the conventional mechanisms may be unable to predict the exposure settings or accurately determine the exposure settings fast enough to keep up with rapid scene changes caused due to the camera's motion and/or motion associated with apparatus or device on which the camera is resident or in communication with.

Example aspects of this disclosure address the above limitations of conventional techniques. In one or more examples, a current scene of a camera or image sensor can include a current image to be captured by the image sensor at a current time. The scene can change from the current scene at a current time (e.g., a first instance in time) to a future scene at a future time (e.g., a second instance in time that is subsequent to the first instance in time) after a lapse of time from the current time. The change from the current scene to the future scene can be caused at least in part due to movement of the image sensor, a camera that includes the image sensor, and/or a device or apparatus that includes the camera that further includes the image sensor. The camera's exposure settings for the current image of the current field of view may be referred to as current exposure settings, while the camera's exposure settings to capture a future image of the future scene may be referred to as future exposure settings.

According to example aspects, systems and methods are described for determining future exposure settings for capturing a future image of the future scene. In some examples, the current exposure settings for capturing the current image of the current scene are determined. One or more motion characteristics associated with the image sensor can also be determined. Based on the motion characteristics, a location of a portion of the current image to use for determining future exposure settings for the image sensor can be predicted. The future exposure settings (e.g., exposure settings not yet determined) that would be utilized for capturing the future image of the future scene, which can be used for capturing a future image of a future scene at the future time, can be determined based on the predicted portion of the current image.

In various examples, calculations for determining the future exposure settings can be initiated based on the prediction of the location of the portion of the current image before the field of view of the image sensor reaches the future scene. This way, once the camera's field of view reaches the future scene, the processing time for determining the future exposure settings for capturing the future image can be minimized or eliminated.

In one or more examples, the motion characteristics can include one or more of a direction of travel or a velocity of the camera. In example aspects, the motion characteristics associated with the image sensor can be determined using different techniques, which may be used individually or in any combination. In some examples, the motion characteristics can be determined based at least in part on a motion measurement unit (e.g., a gyroscope, an accelerometer, and/or other inertial measurement unit) that is part of or in communication with the camera. In some examples, the motion characteristics can be determined based at least in part on input to a steering system in communication with the image sensor. In some examples, the motion characteristics can be determined based at least in part on one or more regions of interest which have been identified in the current image.

FIG. 1 is a block diagram of an example image processing system 100 configured according to aspects of this disclosure. The image processing system 100 can be a component of one or more devices with one or more image capture devices, a component of one or more image capture devices, and/or a component of one or more video capture devices, such as an autonomous vehicle with one or more cameras, a digital camera, a digital video camera, a mobile phone with one or more cameras, a tablet with one or more cameras, a personal computer with one or more cameras, a virtual reality (VR) device (e.g., a head-mounted display (HMD), a heads-up display (HUD), or other VR device) with one or more cameras, an augmented reality (AR) device (e.g., AR glasses or other AR device) with one or more cameras, a gaming system with one or more cameras, or other suitable device.

The image processing system 100 may include various components, among which an image sensor 110, an application platform (AP) 120, and a motion measurement unit 130 are shown. Although not explicitly shown, it will be understood that the image processing system 100 can include additional components, such as one or more memory devices (e.g., RAM, ROM, cache, buffer, and/or other memory components or devices) and/or other processing devices. The components of the image processing system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein.

The image sensor 110 may include one or more components, not specifically illustrated. For example, the image sensor 110 can include components such as a tone control engine, a lens shading correction unit, a linear statistics engine, among other image processing components. In some examples, the image sensor 110 can capture an image by capturing light that makes up pixels of the image. For example, a digital image sensing mechanism of the image sensor 110 can capture images received through one or more lenses (not separately illustrated). The captured image can be digitized and stored as image data in the image sensor 110 (and/or in another part of the image processing system 100) in a local memory or storage medium, and/or may be stored remotely and accessed from the remote storage by the image processing system 100. Various formats for the image data are possible. In one example, the image data can represent the captured image in a red-green-blue (RGB) color space. For example, an RGB image includes red, green, and blue color components per pixel (where image brightness is expressed in the RGB values). In another example, the image data can represent the captured image in a luma, chroma blue, chroma red (YCbCr) color space (where the luma and chroma components are separated). For example, a YCbCr image includes luma, chroma blue, and chroma red color components per pixel. Other examples of image color spaces are also known and can be utilized when performing the techniques described herein.

In some examples, the image data can be processed in one or more components of the image sensor 110, such as the above-mentioned tone control engine, lens shading correction unit, linear statistics engine, etc. The tone control engine may perform a tone mapping of the image data, where a set of input colors in a high dynamic range of the image data are mapped to a set of output colors in a lower dynamic range. The tone mapping may be used to address a reduction of a strong contrast ratio from the captured radiance of a natural scene to a displayable range, while preserving the image details and color appearance important to appreciate the originally captured content. The lens shading correction unit can perform lens shading correction or compensation on the image data to correct or compensate for shading effects which may be introduced in the captured images. The linear statistics engine can bin image data into different bins based on, for example, on a count of the brightness levels (e.g., measured in units of luma) in each bin, and generate linear image statistics based on the counts. In some examples, linear image statistics can include a histogram of the linear statistics.

The AP 120 is shown to include a grid processing engine 122 which can be configured to implement one or more grid metering functions discussed above. The AP 120 also includes an AEC engine 124 configured to determine exposure settings for images based, for example, on the grid metering and possibly in conjunction with other information, such as the linear image statistics (e.g., a histogram of linear statistics) from the image sensor 110. The AP 120 and the AEC engine 124 will be explained in further detail in the following sections. In some examples, the AP 120 can receive the image data from the image sensor 110. In some examples, the image data may be processed through one of the components, such as having a tone mapping implemented in the image sensor 110 before the image data is received by the AP 120. In some examples, the AP 120 can also receive the linear image statistics (e.g., the histogram) from the image sensor 110. Additionally, the AP 120 can receive one or more motion characteristics from the motion measurement unit 130.

The motion measurement unit 130 can include one or more motion detection and/or measurement mechanisms to detect and measure motion of one or more components of the image processing system 100. For example, the motion measurement unit 130 may be affixed on a common platform shared by the image sensor 110, such that the motion measurement unit 130 can measure the motion associated with the image sensor 110. The measured motion can reveal motion characteristics associated with the image sensor 110. These motion characteristics can include one or more of a heading or direction of travel, linear speed, linear velocity, linear acceleration, angular velocity, angular acceleration or rotational rate, any suitable combination thereof, and/or other motion characteristics. In some examples, the motion measurement unit 130 can include an inertial measurement unit which can detect linear acceleration using one or more accelerometers and/or rotational rate using one or more gyroscopes. In some examples, the motion measurement unit 130 can also include (or alternatively include) a magnetometer to provide a heading reference. In some examples, the motion measurement unit 130 can contain one or more accelerometers, gyroscopes, and/or magnetometers per axis for motion characteristics to be measured in each of the three axes (referred to as pitch, roll, and yaw). For instance, the motion measurement unit 130 can determine a rate and degree of movement of the image sensor 110 along a lateral axis (e.g., pitch), a longitudinal axis (e.g., roll), and/or a vertical axis (e.g., yaw).

In some examples, the one or more motion characteristics measured by the motion measurement unit 130 can be provided to the AP 120. The one or more motion characteristics can be used to predict a location of a portion of a current image of a current scene to use for determining future exposure settings for capturing a future image of a future scene by the image sensor 110. In some examples, which will be described in further detail below, the images captured by the image sensor 110 can vary based on the variation in the field of view or scenes viewed by the image sensor 110. For example, the scene changes can result in a variation between current exposure settings for the current image of a current scene view and a future image of the future scene. In some examples, a process of estimating the future exposure settings for the future image can be initiated, and in some instances, completed, before the field of view of the image sensor 110 reaches or includes the future scene.

Figure 2A:
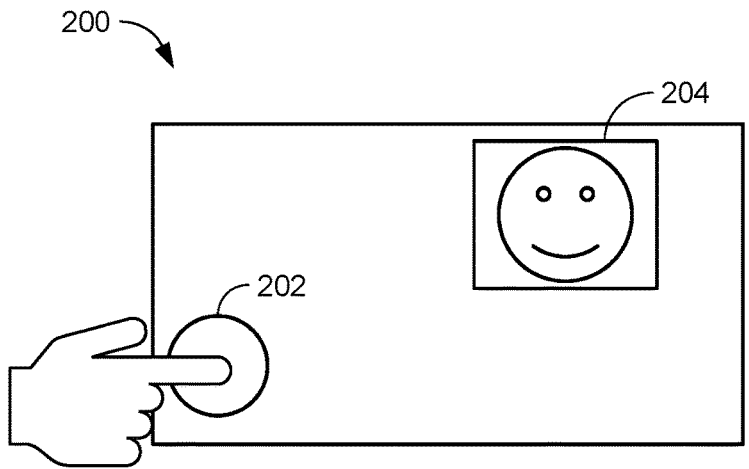
FIG. 2A is a schematic diagram illustrating an image captured by a camera, according to this disclosure.

FIG. 2A is a schematic diagram illustrating an image 200 which can be processed using the image processing system 100, for example. FIG. 2A illustrates examples of one or more regions of interest in the image 200. For example, a region 202 of the image 200 is shown, where the region 202 can be defined based on an input received from a user or client device. In one example, the input may be a touch input, where a touch-screen display associated with the camera can display images previewed through the camera's lens. The image processing system 100 can receive an input from the touch-screen display based on the region 202 being associated with the touch input. In another example, a region 204 of the image 200 can include a subject's face. Face detection mechanisms can be used to identify features such as faces of one or more persons being photographed by a camera. The regions of the image 200 such as the regions 202 and 204 can include regions of interest (ROIs) to be emphasized. In some examples, emphasizing one or more regions of interest of an image can include optimizing exposure settings for the one or more regions of interest. In some examples, the grid processing engine 122 and/or the AEC engine 124 can be configured to adjust exposure settings for one or more regions of interest.

In some examples, the grid processing engine 122 can be used to determine brightness levels for the image 200, as will be discussed in the following sections. Using the grid processing engine 122 and/or any other mechanism, the brightness levels for various portions which make up the image 200 can be obtained. In some examples, the exposure settings for the image 200 can be determined by taking into account the one or more regions of interest. For example, the AEC engine 124 can determine weights to be applied to regions of interest such as the regions 202, 204 in calculating exposure settings for the image 200. In an example, a weight w1 may be assigned to a region of interest such as the region 202 or the region 204. A weight w2 may be assigned to the remaining frame of the image 200. A weighted average can be performed to obtain the brightness levels for the image 200, as follows: image brightness=(ROI brightness*w1+ frame brightness*w2)/(w1+w2), where the ROI brightness refers to the brightness of the ROI (e.g., the region 202 or 204) and the frame brightness refers to the brightness of the remaining portions outside the ROI in the image 200. In some examples, the weights can be calculated as a function of the size of the ROI and/or determined using other mechanisms.

Figure 2B:
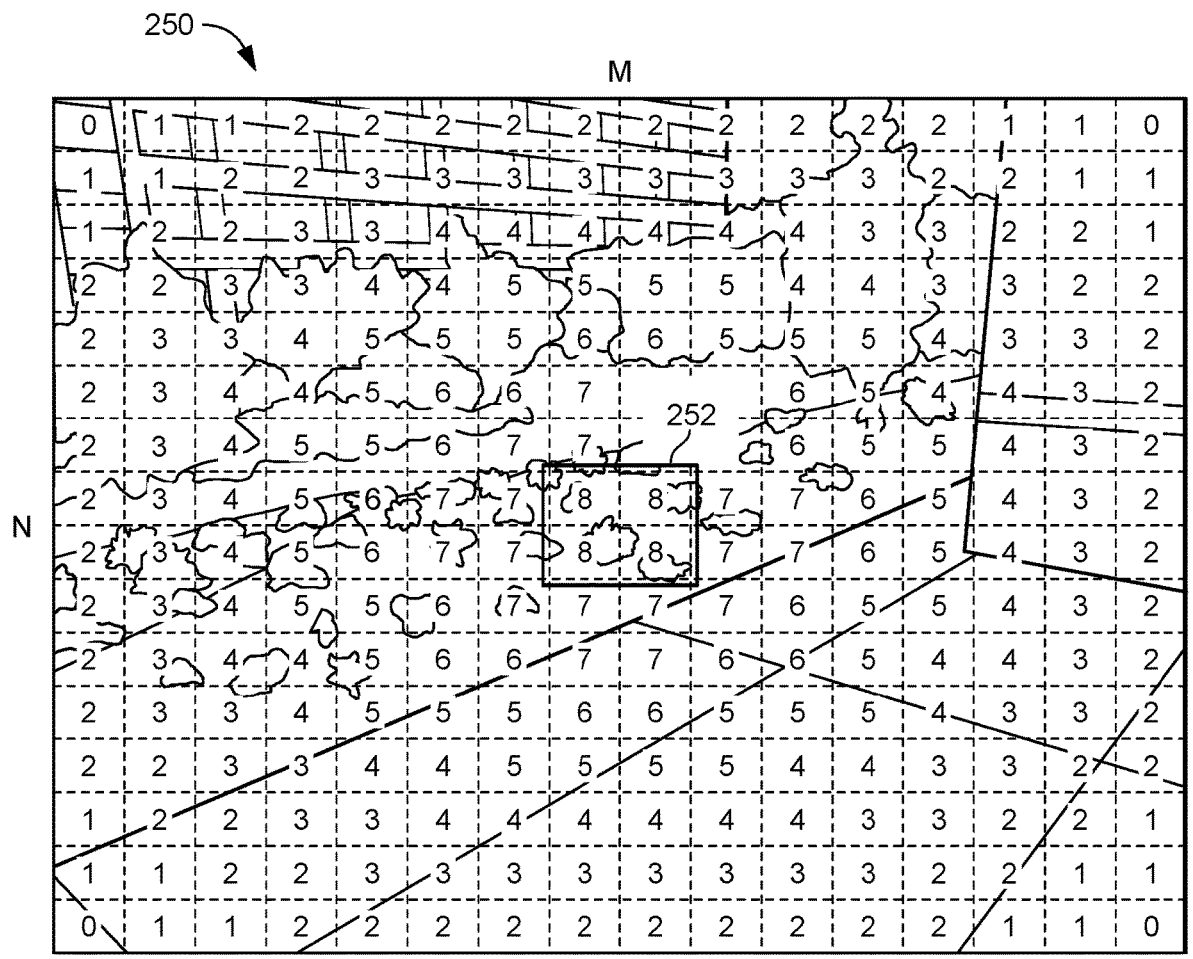
FIG. 2B illustrates a schematic view of a grid for processing an image, according to this disclosure.

FIG. 2B illustrates a schematic representation of grid 250 which can be used by the grid processing engine 122 to determine exposure settings for an image such as the image 200 or any other image. In some examples, the image 200 in FIG. 2B may be a current image of a current scene captured by the image sensor 110. In FIG. 2B, grid elements of the grid 250 which may be used for calculating exposure settings for the image 200 are shown. The grid 250 can be configured according to a grid metering mode used by the image processing system 100. In some examples, the grid 250 may include weights to be applied to statistics such as brightness levels of the various grid elements. In some examples, the statistics can be derived from a Bayer filter in conjunction with data obtained from the image sensor. A Bayer filter can include an arrangement of the photo sensors corresponding to the grid elements of the grid 250. For example, one or more photo sensors may be associated with each grid element. The one or more photo sensors corresponding to a grid element can use filtering techniques to detect brightness of a region of the image 200 corresponding to the grid element. In some cases, the Bayer filter can also use the tone control information and linear statistics histogram in determining brightness levels for the grid elements. In some examples, the dimensions or size of the grid 250, the number of grid elements of the grid 250, etc., may be predefined or these aspects may be based on the characteristics of the image. In some examples, the composition of the grid 250 can be based on the grid metering mode used by the grid processing engine 122.

In some examples, the statistics of the grid elements may be emphasized based on weights. In some examples, the weights may be assigned to regions of interest, as described with reference to FIG. 2A. In some examples, the weights may be assigned to the grid elements based on the grid metering mode. For example, the brightness levels of the grid elements of the grid 250 obtained using the Bayer filter can be weighted according to the center-weighted metering mode. In the grid 250, the statistics such as brightness levels for the center 252 are emphasized. In some examples, the size and the number of grid elements of the grid 250 can be determined based on the capabilities of grid processing engine 122. For example, while a grid which is composed of a large number of grid elements can provide brightness levels at a finer granularity (which can lead to statistics of higher accuracy), power consumption for processing statistics of such a grid may be adversely impacted. For example, the power consumption of the grid processing engine 122 for processing a grid with a large number of grid elements is higher than the power consumption of the grid processing engine 122 for processing a grid with a smaller number of grid elements. Accordingly, the number of elements of the grid 250 can be chosen for a particular metering mode with a view to balancing accuracy of the statistics and capabilities of the grid processing engine 122.

In more detail, the grid 250 is shown with N rows and M columns in the example illustration of FIG. 2B, where N and M may be chosen according to the metering mode and/or the capabilities of the grid processing engine 122 or other factors. The grid elements of the grid 250 may be associated with regions of the image 200 for which exposure settings are to be calculated using the grid 250. Within the grid 250, the portion identified as the center 252 corresponds to grid elements which may be used for calculating exposure settings of a region of focus or a region of interest of the image. As previously described, grid elements can correspond to different regions of the image (e.g., a spot other than the center 252 in a spot metering can correspond to a region of focus of an image; one or more grid elements in a matrix metering mode can correspond to regions of interest such as the regions 202, 204 of the image 200). The weights for the grid elements corresponding to the regions of focus can be based on grid metering techniques in some examples. As such, although the center 252 is shown to include a continuous block of grid elements, it will be understood that aspects of this disclosure are not limited to any specific location or make up of the focus in other examples.

In some examples, the grid processing engine 122 can obtain the statistics in terms of brightness (or luminance or luma) levels for each grid element and apply the weights as identified in the grid 250 to the different grid elements. For instance, the brightness levels can be in a luma value range of 0-255, with a value of 0 corresponding to the darkest possible pixels and a value of 255 corresponding to the brightest possible pixels. As previously mentioned, the grid processing engine 122 can use a Bayer filter to obtain the statistics. The grid processing engine 122 can apply weights to the statistics based on the grid metering mode. In some examples, a grid element for which a higher emphasis or focus is desired can be assigned a higher weight. In the grid 250, weights ranging from 0 to 8 are shown for the various grid elements. The weights for the grid elements in the center 252 are shown to be the highest (a weight value of 8). The highest weights for the grid elements in the center 252 means that the grid elements in the center 252 are assigned the highest focus, while the weights for the grid elements are gradually decreased towards the outer edges and corners of the grid 250 (e.g., from values of 7 for grid elements surrounding the center, down to values of 0, 1, or 2 at the outer edges shown).

In some examples, normalized weighted statistics may be used by the grid processing engine 122. For example, the statistics or brightness levels of a grid element can be multiplied by the corresponding weights in the grid 250 to obtain weighted statistics. A sum of the weights in the grid 250 can be obtained. The normalized weighted statistics can be calculated by dividing the weighted statistics by the sum of the weights. The normalized weighted statistics for the grid elements can be used in some examples in place of the original brightness values to bring the normalized weighted statistics for the various grid elements to be in a closer range.

The AEC engine 124 can receive the statistics and the weights (or in some examples, the normalized weighted statistics) from the grid processing engine 122 and adjust exposure settings for the image 200 based on the statistics and corresponding weights for the grid elements. For example, the AEC engine 124 can adjust the exposure settings by determining a weighted brightness level for each grid element of the grid 250. In some examples, the weighted brightness level for a grid element can be determined based on the brightness level of the grid element and the weight for the grid element. Thus, the brightness levels for a grid element can be emphasized by increasing the weight for the grid element. For example, if the weights for a region comprising one or more grid elements of the grid 250 are increased, the region is emphasized with respect to other regions. Emphasizing the region can result in the brightness levels for the region contributing more heavily to the brightness levels calculated based on the grid 250. For example, in the case of an image which includes a patch of white snow, the brightness of a region of the grid 250 corresponding to the white snow will be high. Emphasizing the region can result in exposing brightness of the image captured of the white snow in relation to the rest of the image, while the overall brightness of the image captured may be lowered. Similarly, if the image to be captured includes a dark tunnel, emphasizing a region of the grid 250 corresponding to the dark tunnel can decrease the brightness of the dark tunnel in the image captured, while increasing the overall brightness of the captured image.

Accordingly in some examples, the AEC engine 124 can emphasize one or more regions of the grid 250 which have higher weights, while regions with lower weights may not be emphasized. In an illustrative example, the AEC engine 124 can increase the emphasis for the regions of the grid 250 corresponding to the center 252, and can decrease the emphasis or leave the emphasis unchanged for the regions of the grid 250 corresponding to outer edges of the grid 250.

Figure 3A:
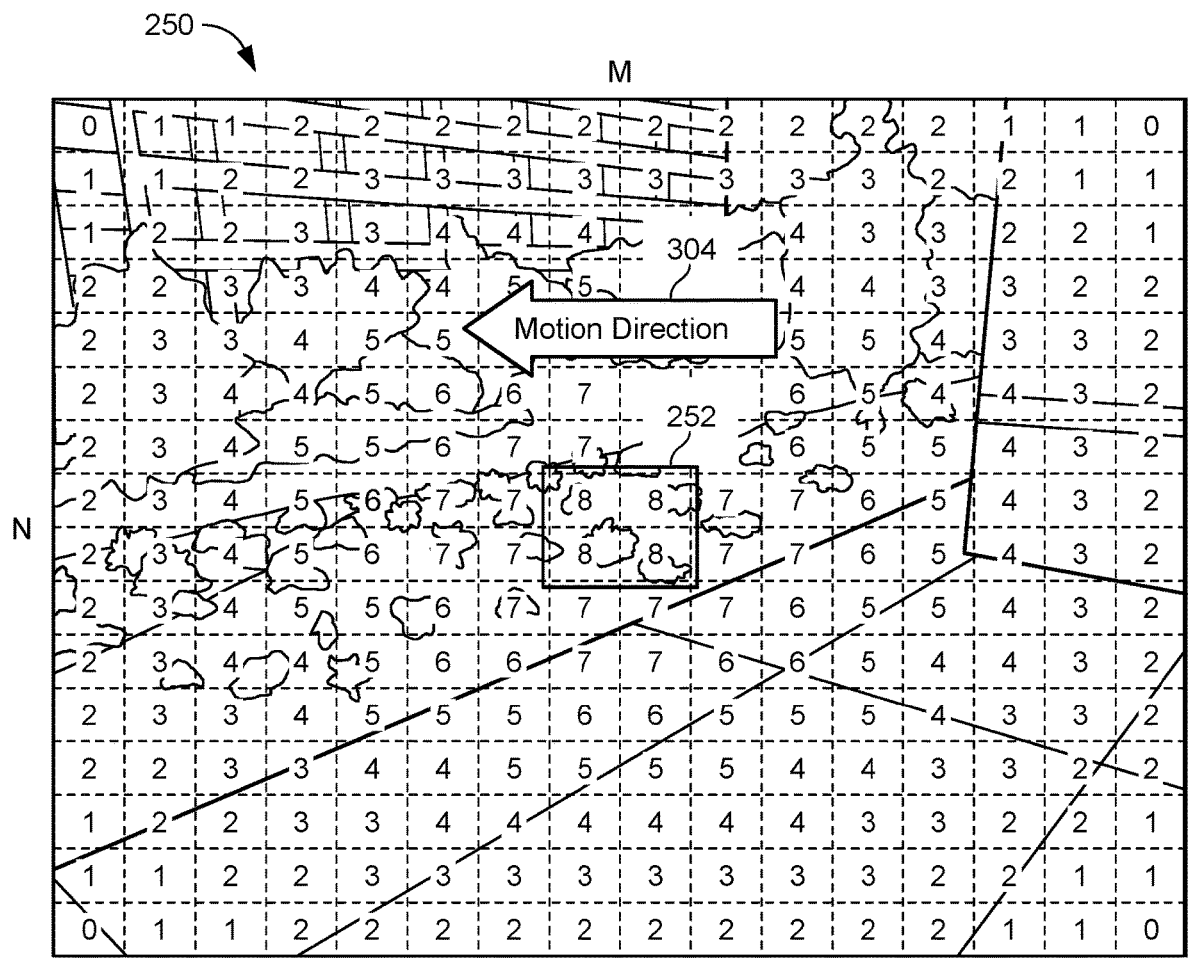
FIG. 3A-FIG. 3B illustrate schematic views of grids for processing an image based on one or more motion characteristics associated with a camera, according to this disclosure.
Figure 3B:
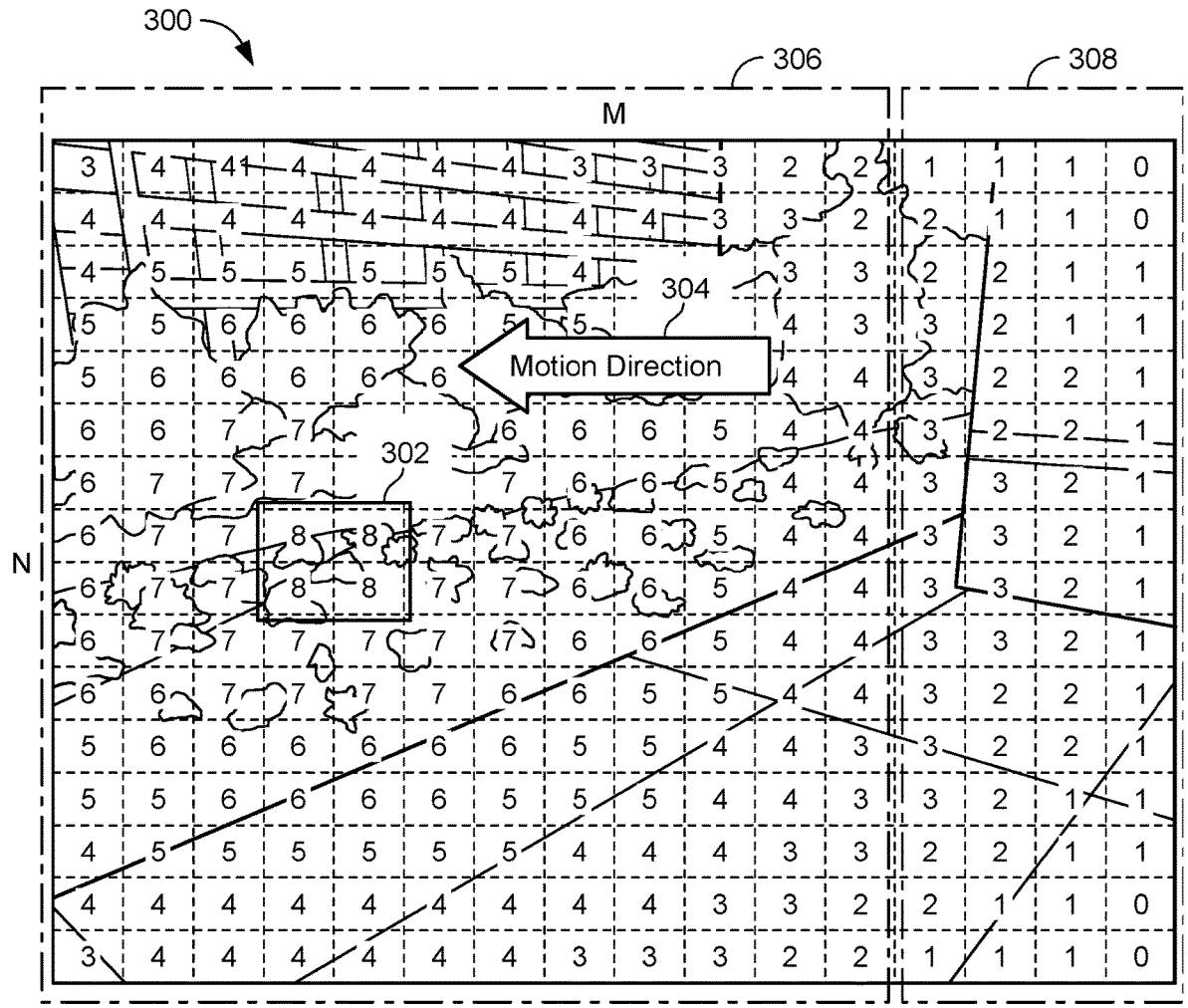

FIG. 3A and FIG. 3B illustrate a schematic representation of motion-based variations in the grid 250. FIG. 3A illustrates the grid 250 discussed with reference to FIG. 2B and also includes an indication of a motion direction 304. The motion direction 304 represents a movement in the field of view or scenes viewed by the camera or image sensor 110 used for capturing images for which exposure settings are calculated based on the grid 250. The motion direction of the image sensor 110 can be in any direction, such as a horizontal direction, a vertical direction, in a depth direction, or in any combination thereof. In the illustrative example shown in FIG. 3A and FIG. 3B, the motion direction 304 may be caused due to horizontal movement of the image sensor 110, causing a corresponding horizontal movement in the scenes viewed by the image sensor 110. One or more motion characteristics for the movement, such as the motion direction 304, the speed at which the movement occurs, etc., can be obtained from the motion measurement unit 130 in some examples. In some examples, the scene changes based on the motion direction 304 can result in a change in the weights for the grid elements to be used in controlling exposure settings for capturing images in the changing scenes. For example, if the grid 250 represents the weights for the grid elements of the current image 200 of the current scene, then the scene changes associated with motion direction 304 can lead to a future scene of which a future image is to be captured by the image sensor 110.

FIG. 3B illustrates a grid 300 for controlling future exposure settings for capturing the future image of the future scene based on the movement. The movement is defined by one or more motion characteristics, such as the motion direction 304, a speed of the movement, and/or other motion characteristic. In the future scene, there may be a new region of focus for images to be captured by the image sensor 110. According to some examples, sections 306 and 308 are illustrated in FIG. 3B. The section 306 indicates a portion of the grid 300 associated with the current image that may be used for calculating future exposure settings for the future image of the future scene. The section 308 indicates a region of the grid 300 associated with the current image that may be excluded or no longer be used for calculating the future exposure settings.

In one or more aspects, a location of the portion of the current image for determining the future exposure settings can be predicted using the one or more motion characteristics obtained from the motion measurement unit 130. For example, the location of the section 306 of the grid 300 to use for determining the future exposure settings can be predicted based on the one or more motion characteristics which include the motion direction 304. In the example shown, the grid processing engine 122 can calculate weights for the future image of the future scene based on predicting the location of the section 306 of the grid 300 to be used for determining the future exposure settings. Correspondingly, predicting the location of the portion of the current image to use for determining the one or more future exposure settings can also include excluding a region of the current image from being used for determining the one or more future exposure settings. For example, the grid processing engine 122 can calculate weights for the future image based on excluding the section 308 from being used for determining the one or more future exposure settings.

In some examples, the motion measurement unit 130 can determine the one or more motion characteristics which may be used in predicting the location of the section 306 to be used for determining the one or more future exposure settings and for excluding the section 308 from being used for determining the one or more future exposure settings. For example, the motion measurement unit 130 can include an accelerometer to detect the speed of movement, a magnetometer to detect the direction of travel (e.g., the motion direction 304), and/or a gyroscope to measure a rate of rotation in degrees per second along several axes (e.g., three axes in x, y, and z directions). For example, panning the camera to the left (i.e., the motion direction 304) from the current scene at a certain speed can result in the center of the future image at the future time being located at a determinable or predictable distance to the left of the center of the current image 200 shown in FIG. 2B. For example, the center 302 to be emphasized in the section 306 for determining the future exposure settings can be predicted to be at a location which is at a determinable distance to the left of the center 252 of the grid 200 shown in FIG. 2B.

In more detail, the weights for the grid elements of the grid 300 can be calculated based on a prediction of the location of the section 306 of the grid 300 which will be used for determining the future exposure settings for capturing the future image. For example, the weights may be determined based on the prediction that the section 306 will be located in a left portion of the grid 300, corresponding to a movement of the center 352 from the center 252 to the left. Since the section 306 is predicted to be used for calculating weights for the future exposure settings, the grid elements in the section 306 can be weighted more heavily. Conversely, section 308 is predicted to be excluded from being used for calculating weights for the future exposure settings, and correspondingly, the grid elements of the section 308 can be weighted less heavily. In some examples, the weights for the center 302 can be emphasized by determining these weights to be the maximum value (e.g., 8) and the weights for the remaining grid elements of the section 306 can be recalculated according to a chosen metering mode. The weights for the grid 300 with the weights for grid elements in the section 306 and the section 308 as above, can be calculated in anticipation of the future field of view that will be reached by the image sensor 110 at the future time, based on the one or more motion characteristics.

In some examples where motion sensors in the motion measurement unit 130 can be used to determine the one or more motion characteristics, the motion sensors can provide information which can be used in predicting the location of the section 306. For example, the motion sensors can reveal whether a camera in motion is accelerating or decelerating, based on which the AEC engine 124 may be tuned. Correspondingly, during the acceleration a less conservative tuning may result in an estimation of the center 302 being displaced to the far left of the grid 300 (relative to the center 252), while a more conservative tuning may result in an estimation of a smaller displacement of the center 302.

In one example, the grid processing engine 122 may determine the grid metering weights as shown in the grid 250 for image data provided by the image sensor 110 at a current time. The grid processing engine 122 may calculate the weights for the grid elements of the grid 250 with the center 252 being emphasized for determining the current exposure settings for a current image of a current scene to be captured by the image sensor 110. The grid 250 may include weights based on a center-weight based metering mode as discussed above. The camera including the image sensor 110 may already be in motion at the current time or start to move at the current time. The motion measurement unit 130 may measure the movement of the image sensor 110 and provide one or more motion characteristics based on the movement to the grid processing engine 122. The grid processing engine 122 may receive one or more motion characteristics (e.g., including the motion direction 304 and a speed of travel along the motion direction 304) from the motion measurement unit 130.

The grid processing engine 122 may determine the grid 300 for a future time which is later than the current time, where the location of the section 306 of the grid 300 to be used for determining future exposure settings for capturing a future image at the future time are predicted based on the one or more motion characteristics. For example, the distance traveled by the camera can be determined based on the speed and direction. The distance traveled by the camera can be used to estimate a scene change from the current scene to the future scene in a duration of time between the current time and the future time. The grid processing engine 122 may determine or estimate that the center 302 to be emphasized for calculating the future exposure settings view will be located at a distance which is displaced from the center 252, and the grid processing engine 122 may determine the weights for the grid elements of the sections 306 and 308 of the grid 300 accordingly.

In some examples, the grid processing engine 122 may initiate the process of determining the weights for the grid elements of the grid 300 before the future time. In some examples, the grid processing engine 122 may complete the process of determining the weights for the grid elements of the grid 300 before the future time such that the weights for the grid elements of the grid 300 are already determined in advance of the camera's field of view reaching the future scene based on the camera's motion. Accordingly, any processing delays in calculating the weights for the future exposure settings once the camera's field of view reaches or includes the future scene can be eliminated or minimized.

In the above examples, it is assumed that the prediction or estimation involved in the calculation of the weights for the grid elements of the grid 300 is correct. To validate the prediction, the image processing system 100 can include mechanisms to verify whether the camera followed the trajectory indicated by the one or more motion characteristics. For example, the future scene can be determined at the future time and compared with the estimated future scene. If the estimated future scene substantially coincides with the actual future scene at the future time, the weights calculated by the grid processing engine 122 for the grid elements of the grid 300 can be retained. Otherwise, the grid processing engine 122 may discard the estimated weights and recalculate the weights.

FIG. 4A and FIG. 4B illustrate a schematic representation of grid metering techniques using a spot metering mode and based on one or more motion characteristics. FIG. 4A illustrates a grid 400 used for calculating exposure settings of images to be captured by a camera. The grid 400 may contain N1 rows and M1 columns of grid elements. In an illustrative example, the camera may be a point of view (POV) camera or a dash camera placed on a vehicle and configured to capture scenes in the direction of travel of the vehicle. The weights (not specifically shown) for the grid elements of the grid 400 may be calculated by the grid processing engine 122. In an example, the grid processing engine 122 may utilize a spot metering mode to calculate the weights for the grid 400 based on one or more motion characteristics associated with the camera.

The point of focus may change as the vehicle moves. Based on one or more motion characteristics such as the speed, direction of travel, etc., of the vehicle, the grid processing engine 122 can calculate weights for determining future exposure settings for capturing future images of future scenes, according to this disclosure. For example, the spot 402 comprises a group of one or more grid elements of the grid 400, where the spot 402 indicates a region of the grid 400 to be emphasized an image. If the grid 400 represents a grid to be used for determining current exposure settings for a current image by emphasizing the spot 402, then a location of a portion of the grid 400, such as a section 406 that will be used for determining future exposure settings can be predicted based on the one or more motion characteristics associated with the vehicle (and correspondingly associated with the camera affixed on the vehicle). Correspondingly, a section 408 of the grid 400 represents a region of the current image that will be excluded from use in determining the one or more future exposure settings.

For example, the motion measuring unit 130 can receive information regarding the motion characteristics associated with the vehicle (e.g., from one or more accelerometers, gyroscopes, etc., used by the vehicle) in addition to or as an alternative to the one or more inertial measurement units which may be components of the motion measurement unit 130. The motion measurement unit 130 can provide the one or more motion characteristics to the grid processing engine 122 based on any combination of the motion measurements. The grid processing engine 122 can recalculate the weights to emphasize a new spot (not shown) of the section 406 based on the estimated point of focus in the future scene. The section 406 is predicted to be used for determining the future exposure settings. The location of the section 406 can be predicted based on the one or more motion characteristics. The grid processing engine 122 can assign higher weights to a new spot in the section 406 corresponding to a point of focus in the future image. The AEC engine 124 can adjust exposure settings based on the weights from the grid processing engine 122. For example, based on the one or more motion characteristics, the AEC engine 124 can increase the brightness levels for the grid elements of the spot in the section 406 with higher weights for determining the future exposure settings for capturing the future image of the future scene.

FIG. 4B illustrates a grid 450 used for calculating exposure settings of images to be captured by a camera. The grid 450 may contain N2 rows and M2 columns of grid elements. In an illustrative example, the camera may be a point of view (POV) camera or a dash camera placed on a vehicle and configured to capture scenes in the direction of travel of the vehicle. In FIG. 4B, the direction of travel may include an off-center location in a future scene, relative to a current scene viewed by the camera. A marker 454 is identified in the image underlying the grid 450, which includes an arrow mark. The marker 454 provides an indication of a curve on a road on which the vehicle is traveling. The marker 454 may be identified by a graphics processing unit or "GPU" (not specifically shown) of the image processing system 100. The graphics processing unit can include artificial intelligence or machine learning capabilities to detect markers such as the marker 454 and predict one or more motion characteristics accordingly. The motion characteristics predicted using the marker 454 can be used in conjunction with the motion characteristics obtained from the motion measurement unit 130 in some examples. For example, the motion characteristics predicted using the marker 454 can be provided to the motion measurement unit 130 by the graphics processing unit, where the motion measurement unit 130 can combine the motion characteristics from the inertial measurement sensors of the motion measurement unit 130 and the motion characteristics from the graphics processing unit in estimating the one or more motion characteristics for the camera. In some examples, the motion measurement unit 130 can also receive detailed directions for travel information from a navigation system (e.g., based on a global positioning system) and combine the detailed directions with the input from the graphics processing unit. For example, the navigation system can have information that a right turn is coming up in the direction of travel based on the direction having been previously mapped out, and the graphics processing unit can map the direction of travel to the current scene being viewed by the camera (e.g., that of the upcoming left turn or a crossroad). The motion measurement unit 130 can determine, based on the navigation system and the graphics processing unit, the location of the right turn, and the grid processing engine 122 can assign higher weights for exposing images in the right turn direction. The AEC engine 124 can correspondingly emphasize the right turn direction based on the higher weights.

In the illustrated example of FIG. 4B, the curve in the road as indicated by the marker 454 can lead to the focus in a future field of view of the vehicle to be located at the spot 452. The weights (not specifically shown) for the grid elements of the grid 450 may be calculated by the grid processing engine 122. In an example, the grid processing engine 122 may utilize a spot metering mode to calculate the weights for the grid 450 based on the one or more motion characteristics obtained from the motion measurement unit 130, which can include the motion characteristics from the graphics processing unit as discussed above. For example, the spot 452 comprises a group of one or more grid elements of the grid 450, where the spot 452 indicates higher weights to be applied to a point of focus estimated of a driver of the vehicle.

Based on the one or more motion characteristics such as the speed, direction of travel, etc., as obtained from the motion measurement unit 130 and the graphics processing unit, the grid processing engine 122 can predict a location of a section 456 of the grid 450 which will be used for determining future exposure settings for a future image, and a section 458 which will be excluded from determining future exposure settings for the future image. The grid processing engine 122 can calculate the weights for future exposure settings for the future image by assigning higher weights to a spot such as the spot 452 for calculating the weights for the future exposure settings using the section 406. The AEC engine 124 can adjust exposure settings by prioritizing the points of focus. For example, based on the one or more motion characteristics, the AEC engine 124 can increase the brightness levels for the grid elements of the spot with the higher weights for the future image.

Figure 5:
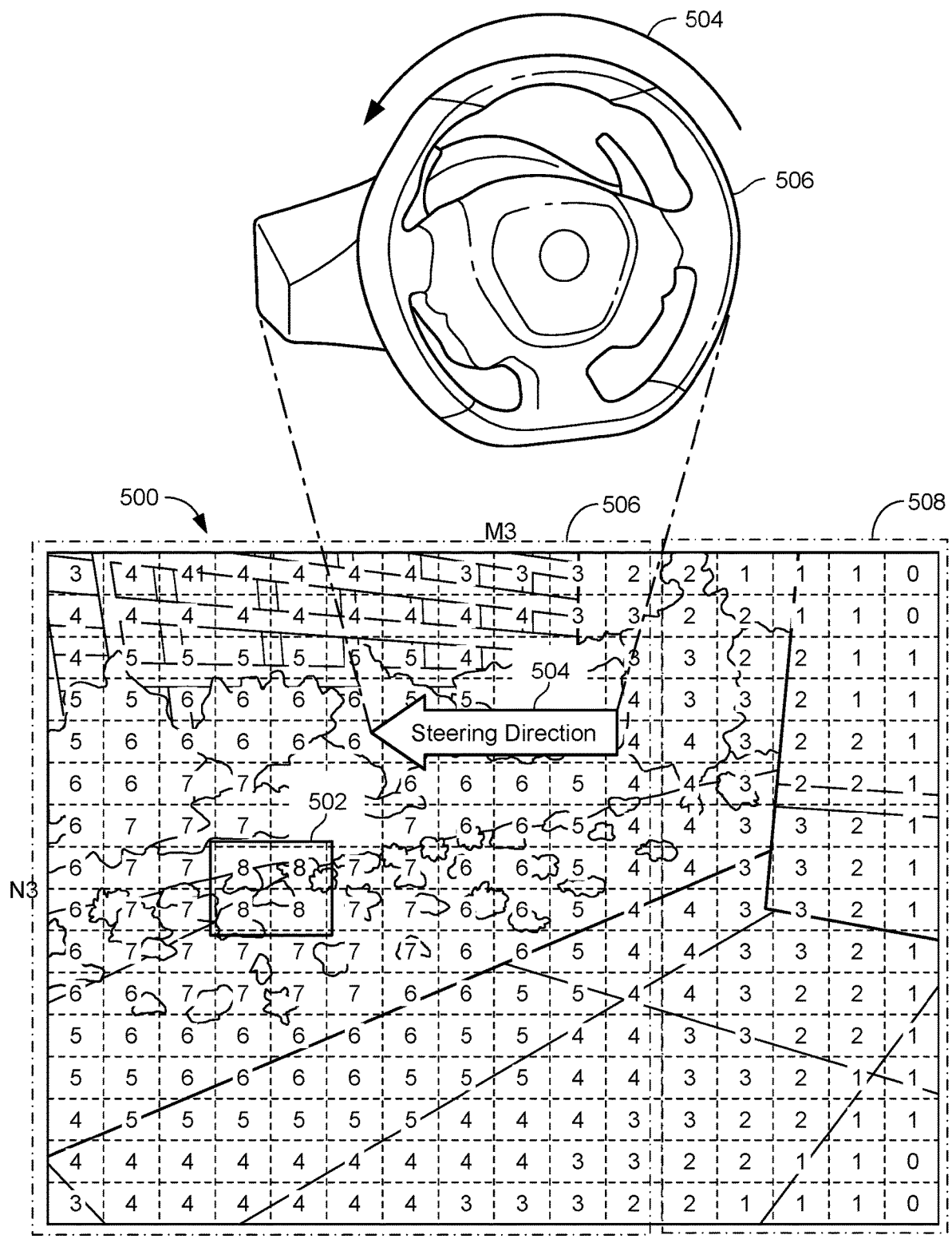
FIG. 5 illustrates a schematic view of a grid for processing an image based on one or more motion characteristics associated with a camera and a steering direction of a steering wheel, according to this disclosure.

FIG. 5 illustrates a schematic representation of grid metering techniques using a center-weight based metering mode and based on one or more motion characteristics. In FIG. 5, a grid 500, which can be used for calculating exposure settings of images to be captured by a camera, is shown. Also shown is a steering wheel 506 which may be used in conjunction with the motion measurement unit 130 to obtain one or more motion characteristics associated with the camera. The grid 500 may contain N3 rows and M3 columns of grid elements. In an illustrative example, the camera may be a point of view (POV) camera or a dash camera placed on a vehicle and configured to capture scenes in the direction of travel of the vehicle. The steering wheel 506 may be used to control direction of travel of the vehicle. In an example, a steering direction 504 can correspond to a turn or change in direction of the vehicle caused by turning the steering wheel 506 in the steering direction 504. In an example, the steering direction 504 can cause corresponding changes in the scenes viewed by the camera. In some examples, the grid processing engine 122 can calculate weights for the grid 500 to be used for calculating future exposure settings based at least in part on the steering direction 504.

In some examples, sensors or actuators can detect motion characteristics such as the change in direction of the vehicle caused due to rotation of the steering wheel 506. The steering direction 504 can be calculated based on the detected motion characteristics and a speed of travel of the vehicle and/or other possible motion characteristics obtained from the motion measurement unit 130. In some examples, the rotation of the steering wheel 506 can be provided as an input to the motion measurement unit 130, and the motion measurement unit 130 may determine the one or more motion characteristics including the steering direction 504. For example, the motion measurement unit 130 can combine the motion characteristics based on the rotation of the steering wheel 506 with motion characteristics based on the one or more inertial measurement sensors of the motion measurement unit 130 to generate the motion characteristics to be used by the grid processing engine 122.

In the illustrated example of FIG. 5, the steering direction 504 (caused at least in part due to the rotation of the steering wheel 506) can lead to changes in scenes, where the grid 500 can be used for determining exposure settings for images in the changing scenes. For example, the weights for the grid elements of the grid 500 can be calculated to emphasize a center of an image to be captured.

In some examples, based on the one or more motion characteristics, a location of a section 506 to be used for determining the future exposure settings for a future image can be predicted based on the one or more motion characteristics. Correspondingly, a section 508 that will be excluded from the grid 500 for determining the future exposure settings can also be predicted. For example, the future exposure settings can be determined by emphasizing a center of the future image. In some examples, the weights for the center 502 can be estimated to be the maximum value (e.g., 8) and the weights for the remaining grid elements of the section 506 can be lower. The weights for the section 508 can be determined (e.g., to be a low value) based on the prediction that the section 508 will be excluded from determining the future exposure settings. The weights for the sections 506 and 508 of the grid 500 can be calculated in anticipation of the future image that will be captured by the camera at a future time based on the one or more motion characteristics. The AEC engine 124 can adjust exposure settings based on the center 402 being weighted more heavily. For example, based on the one or more motion characteristics, the AEC engine 124 can increase the brightness levels for regions of the future image that correspond to the center 502.

Figure 6A:
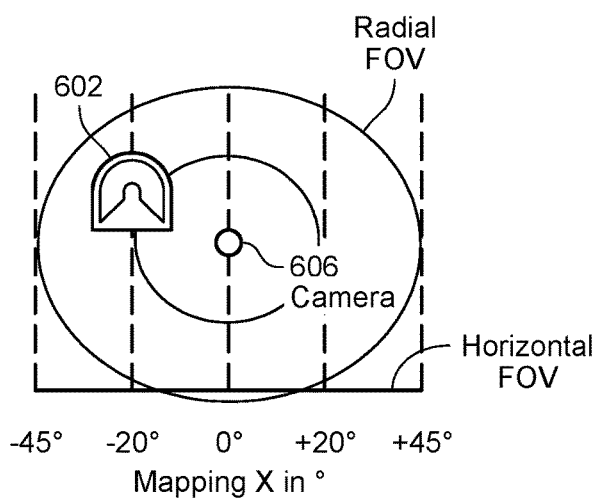
FIG. 6A-FIG. 6D are diagrams illustrating schematic views of variations in fields of view of a camera based on movement of the camera, according to this disclosure.

FIGS. 6A, 6B, 6C, and 6D illustrate schematic diagrams for variations in a field of view of a camera based at least in part on motion characteristics associated with the camera. FIG. 6A shows a current scene 600 which includes a tunnel 602. The current scene 600 may be viewed by a camera of a vehicle, similar to the examples discussed above. In the example illustration of FIG. 6A, the current scene 600 is shown to be mapped to degrees on a horizontal field of view (FOV) scale of the camera. For example, FIG. 6A shows the current scene 600 mapped to 90° on an x axis, from −45° to +45°. The tunnel 602 is shown to be in a region mapped to −20° in the current scene 600. The tunnel 602 is referred to as being located in a portion of the current scene 600 corresponding to peripheral location.

Figure 6B:
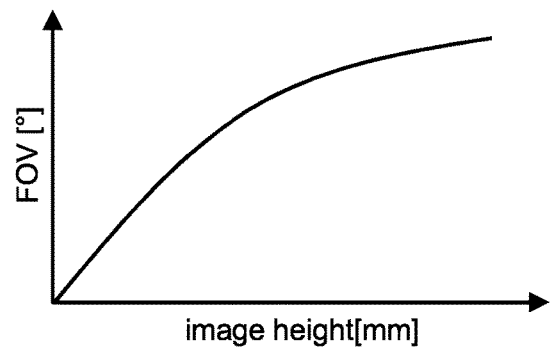

FIG. 6B illustrates a 2D mapping of a height of an image of interest, such as the tunnel 602 (e.g., image height [mm] shown on the horizontal axis) to the field of view (FOV) in degrees (e.g., "the FOV[°]" shown on the vertical axis). As shown in FIG. 6A, a two-dimensional (2D) image can extend in a radial fashion in the radial FOV, in both the horizontal axis (x axis) and the vertical axis (y axis). A mapping of regions of an image such as the tunnel 602 to the current scene 600 (e.g., horizontal FOV) in degrees can be based on characteristics of the camera (e.g., characteristics of a lens or image sensor used for viewing the image of the current scene 600). In some examples, the image height may be converted from a unit of length such as mm to a different unit, such as a number of pixels in the vertical or height direction of the tunnel 602.

Figure 6C:
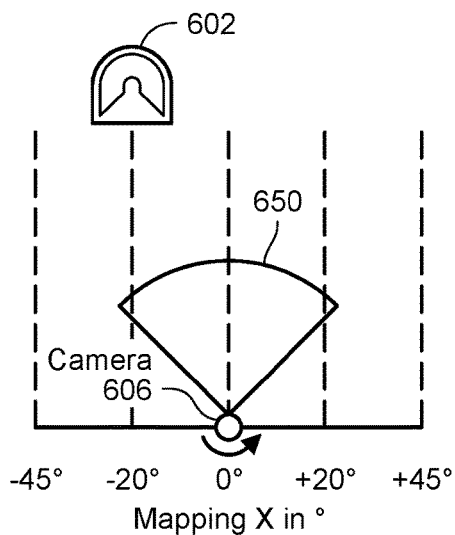

FIG. 6C illustrates an example aspect of scene changes of a camera 606 caused due to motion of the camera 606. In FIG. 6C, the current scene 600 is shown from the perspective of the camera 606, with the tunnel 602 being located in the peripheral location, i.e., at a −20° position in the current scene 600 as in FIG. 6A. In FIG. 6C, movement of the camera is also illustrated in the direction 604. In one illustrative example, the movement of the camera 606 may be caused due to rotation of the steering wheel 506 as discussed with reference to FIG. 5. In various examples, the movement of the camera 606 may be based on any rotation in the direction 604 as shown in FIG. 6C. One or more motion characteristics associated with the camera 606, such as the rotation in the direction 604, may be determined by the motion measurement unit 130. In some examples, any other mechanism such as a graphics processing unit or a steering wheel's rotation detection system can be used in conjunction with the motion measurement unit 130 to determine the one or more motion characteristics associated with the camera 606.

For determining current exposure settings for capturing a current image of the current scene 600, the grid processing engine 122 can generate a grid with weights which emphasize exposure settings for the tunnel 602. For example, if there is a significant contrast ratio between the tunnel 602 and the remaining portions of a current image captured by the camera 606 in the current scene 600, the grid processing engine 122 can assign higher weights to grid elements corresponding to the tunnel 602 (e.g., using a spot metering mechanism) than to grid elements in corresponding to other portions of the image.

Figure 6D:
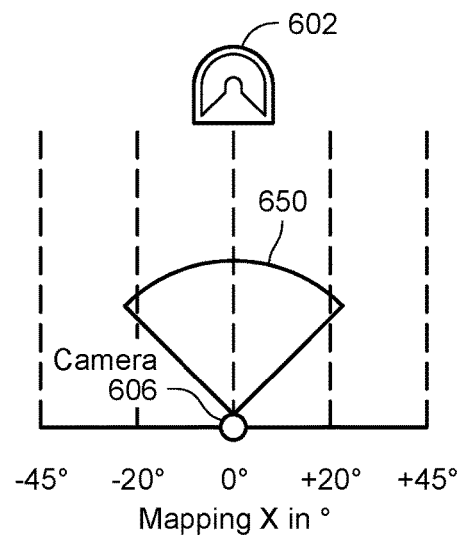

FIG. 6D illustrates a future scene 650 that will be viewed by the camera 606 based on the movement along the rotation 604. In FIG. 6D, the tunnel 602 is shown to be at the center or at a 0° position in the future scene 650. In example aspects, the location of the tunnel 602 in the future scene 650 may be predicted based on the rotation 604. In example aspects, future exposure settings for the future scene 650 may be determined based on predicting a location of a portion of the current image that will be used for determining the future exposure settings. The calculations for determining the future exposure settings can be performed (e.g., initiated and/or completed) before the field of view of the camera 606 reaches or includes the future scene 650. The following examples illustrate techniques for determining the future exposure settings.

In an illustrative example, the camera 606 may stream video images at a rate of 30 frames per second (fps). Thus, the field of view of the camera 606 may include a new frame every $\frac{1}{30}$ seconds (or $\frac{1}{30}$s). Based on the speed of movement of the camera (angular and/or linear speed) relative to the 30 fps rate, the field of view may change to include a new frame at a rate which is less, equal to, or more than one frame every $\frac{1}{30}$s. In an example, determining the future exposure settings can involve predicting the location of one or more regions of the current image that will be used for determining the future exposure settings. For example, predicting the location of one or more regions of the current image can include predicting a portion of an image which will be at the center or at a 0° position when the camera's field of view reaches or includes the future scene 650. In the illustrative example where the camera streams video images at the rate of 30 fps, the location of the portion (e.g., the tunnel 602) of the current image that will be at the center of the camera's field of view in $\frac{1}{30}$ seconds can be estimated or predicted based on the speed of movement of the camera.

In an example, a sensor such as a gyroscope in the motion measurement unit 130 can be used to determine an angular velocity $\omega[°/s]$ of the rotation 604 of the camera 606 along yaw axis or x axis can be calculated as displacement in degrees: displacement[°]=$\omega*\frac{1}{30}$. The displacement in degrees can be converted into displacement in pixels, displacement [pixels]. The displacement in pixels can reveal the image location in the current image which will be at the center in the future image in $\frac{1}{30}$s. In the example shown, the tunnel 602 can appear at the center of the camera 606 after a certain multiple of $\frac{1}{30}$s, based on the displacement calculated as above. Accordingly, for the future scene 650 where the center of the camera 606 includes the tunnel 602, future exposure settings may be calculated to emphasize the tunnel 602 in a future image of the future scene 650.

In some examples, the motion measurement unit 130 may use similar calculations above for other types of inertial measurement. For example, an accelerometer may be used to determine velocity or speed of the camera for a linear motion, similar to the gyroscope used for determining angular velocity.

In some examples, the motion measurement unit 130 can use a navigation system to provide the steering and speed measurements. Based on a vehicle's rotation radius r provided by steering and based on a linear speed v, angular velocity co may be calculated as "r/v". Based on angular velocity co displacement[°] can be obtained as ω*1/30.

Accordingly, in example aspects the future exposure settings for a future image of a future scene of a camera may be calculated in advance of a camera's field of view reaching or including the future scene. Performance of an image processing system for processing images captured by the camera can be improved by minimizing or eliminating the processing time involved in calculating exposure settings once the camera's field of view reaches or includes the future scene. The performance improvement may be significant in examples where the camera's motion characteristics may involve high speeds (linear/angular).

Figure 7:
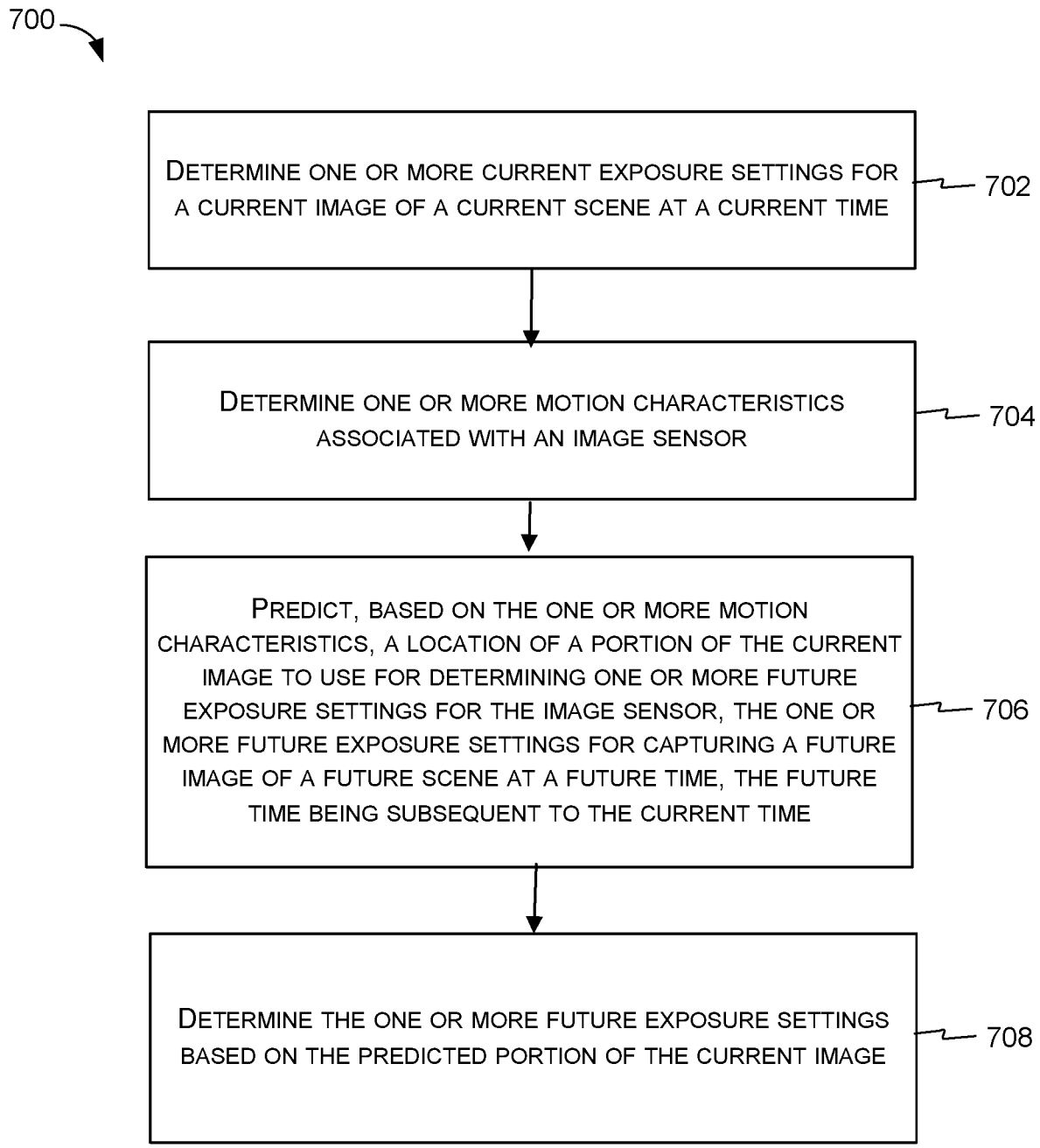
FIG. 7 is a flowchart illustrating an example process for processing one or more images, according to this disclosure.

Accordingly, it will be appreciated that example aspects include various methods for performing the processes, functions and/or algorithms disclosed herein. For example, FIG. 7 illustrates a process 700 for processing one or more images according to aspects of this disclosure. In some examples, the process 700 may be implemented by the image processing system 100.

At block 702, the process 700 includes determining one or more current exposure settings for a current image of a current scene at a current time. For example, one or more current exposure settings for a current image of a current scene can be calculated using the grid 250, with its center 252 being emphasized with higher weights. The grid 250 can be used by the grid processing engine 122 for determining current exposure settings for capturing the current image 200 of the current scene viewed by the image sensor 110 at the current time, as explained with reference to FIG. 2B.

At block 704, the process 700 includes determining one or more motion characteristics associated with an image sensor. In some examples, the one or more motion characteristics from the motion measurement unit 130 can be obtained by the grid processing engine 122. In some examples, the one or more motion characteristics can include one or more of a speed or a direction of travel of the image sensor 110. In some examples, the one or more motion characteristics can be based at least in part on an inertial sensor in communication with the image sensor 110. For example, the one or more motion characteristics may be determined by the motion measurement unit 130 using one or more inertial measurement sensors such as an accelerometer, a gyroscope, or a magnetometer.

In some examples, the one or more motion characteristics can be based at least in part on a steering system in communication with the image sensor. For example, the steering direction 504 of the steering wheel 506 can be obtained by one or more sensors connected to the steering wheel 506 as shown in FIG. 5. The steering direction 504 can be included in the calculation of the one or more motion characteristics by the motion measurement unit 130.

In some examples, the one or more motion characteristics can be based at least in part on one or more regions of interest of the current image. For example, a graphics processing unit, possibly in combination with a navigation system as discussed above, can determine a region of interest such as the spot 452 based on a direction of travel determined using the marker 454 and input from the navigation system, as shown in FIG. 4B. In another example, the graphics processing unit can determine that a future point of focus can include a new spot such as the spot 452 based on the direction of travel of the vehicle, as shown in FIG. 4A. In another example, the region of interest can include the tunnel 602 with a high contrast ratio with a remaining portion of images in the field of view of the camera, as shown in FIGS. 6A through 6D.

At block 706, the process 700 includes predicting, based on the one or more motion characteristics, a location of a portion of the current image to use for determining one or more future exposure settings for the image sensor, the one or more future exposure settings for capturing a future image of a future scene at a future time, the future time being subsequent to the current time. For example, based on the one or more motion characteristics, the location of a portion of the grid 300 corresponding to a portion of the current image 200, such as the section 306, to be used for determining the one or more future exposure settings can be predicted. Correspondingly, a section of the grid 300 corresponding to a region of the current image 200, such as the section 308, to be excluded from being used for determining the one or more future exposure settings can also be predicted.

In some examples, the grid processing engine 122 can determine weights to be applied to the grid elements based on the sections 306 and 308 of the grid 300. For example, in a center-weighted metering mode, the center 302 can be weighted more heavily in the section 306 to be used for determining the one or more future exposure settings. In some examples, grid elements corresponding to one or more regions of interest of an image can be weighted in a manner which emphasizes the regions of interest of the image. In some examples, emphasis provided to a region with a heavier weight can include adjusting exposure settings such as brightness levels for the region.

In some examples, the AEC engine 124 can use the weights determined by the grid processing engine 122 and determine exposure settings for grid elements based on the estimated variation and the current exposure settings for a current image of a current field of view of the image sensor. For example, the AEC engine 124 may use the brightness levels for the current image of the current field of view of the grid 250, and weights determined by the grid processing engine 122 for the grid 300 using the section 306 based on the motion direction 304 as shown in FIGS. 3A and 3B.

At block 708, the process 700 includes determining the one or more future exposure settings based on the predicted portion of the current image. For example, the AEC engine 124 can determine the one or more future exposure settings for the future image using the section 306 of the grid 300 with the center 302 being weighted more heavily, as discussed above.

In some examples, the one or more future exposure settings for the future image can be determined before a field of view of the image sensor reaches or includes the future field of view. For example, the process of determining the future exposure settings may be initiated, or on in some instances, completed, based on the one or more motion characteristics associated with the image sensor 110, before the camera's field of view reaches or includes the future scene. Depending on processing speeds of the AEC engine 124 and the speed of movement of the camera, for example, the future exposure settings for the future image may be ready to be applied to the future image before the camera's field of view reaches or includes the future scene.

Figure 8:
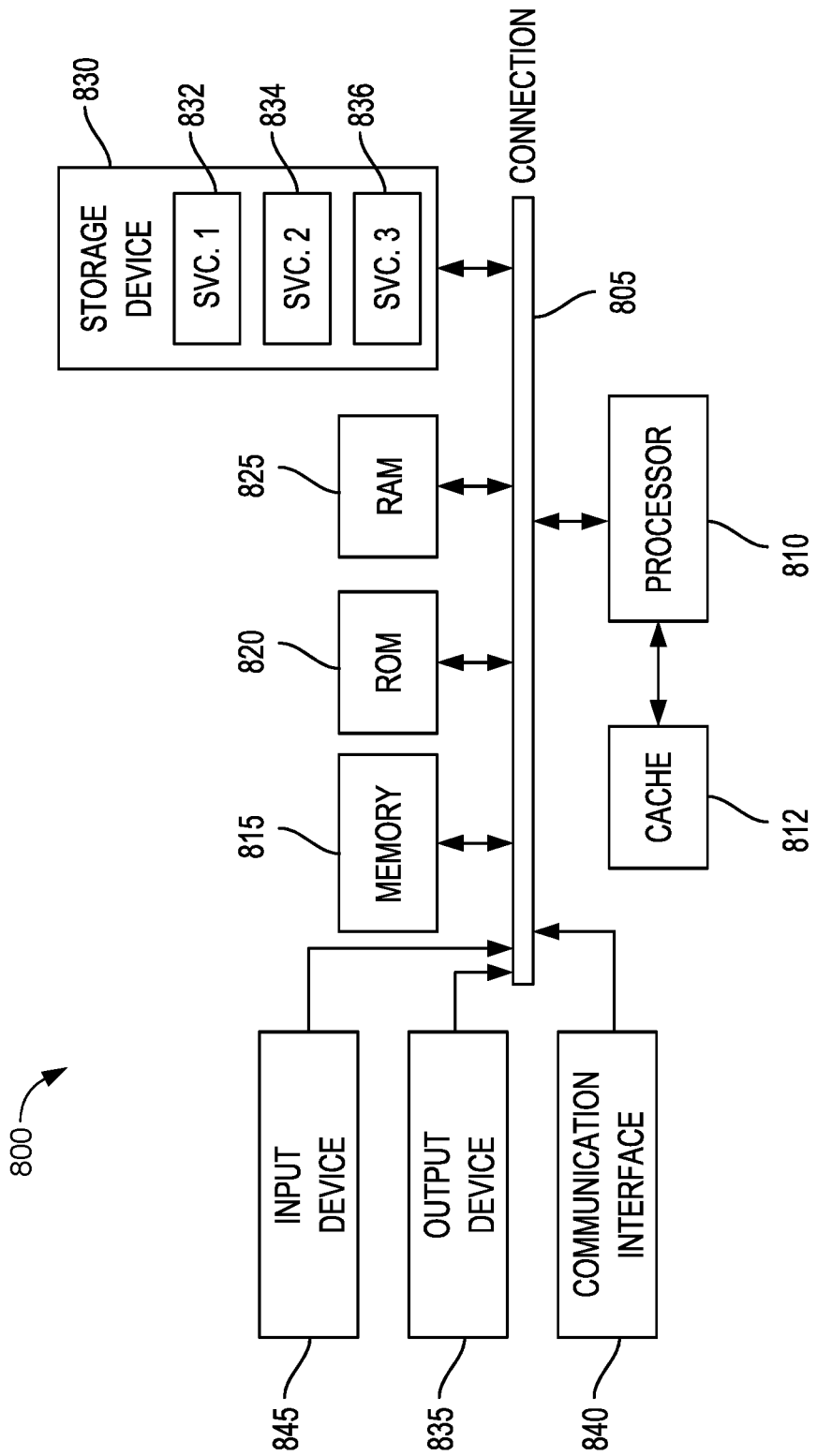
FIG. 8 is a block diagram illustrating an example computing device architecture of an example computing device which can implement the various techniques described herein.

FIG. 8 illustrates an example computing device architecture 800 of an example computing device which can implement the various techniques described herein. For example, the computing device architecture 800 can implement the one or more processes described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including a computing device memory 815, such as a read only memory (ROM) 820 and a random access memory (RAM) 825, to the processor 810.

The computing device architecture 800 can include a cache of a high-speed memory connected directly with, in close proximity to, or integrated as part of the processor 810. The computing device architecture 800 can copy data from the memory 815 and/or the storage device 830 to the cache 812 for quick access by the processor 810. In this way, the cache 812 can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in the storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

The storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include the services 832, 834, 836 for the controlling processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of processing one or more images, the method comprising:
    determining one or more current exposure settings for a current image of a current scene at a current time;
    processing the current image using the one or more current exposure settings;
    determining, during travel of an apparatus to a destination, one or more motion characteristics associated with an image sensor of the apparatus;
    detecting an object in a first portion of the current image, the object being associated with a route of travel of the apparatus to the destination, the object associated with the route of travel and the one or more motion characteristics being different;
    determining, based on the one or more motion characteristics and the object associated with the route of travel of the apparatus to the destination, a second portion of the current image to use for determining one or more future exposure settings for the image sensor, the one or more future exposure settings for capturing a future image of a future scene at a future time, the future time being subsequent to the current time; and
    determining the one or more future exposure settings based on the determined second portion of the current image.

2. The method of claim 1, further comprising:
    determining the one or more future exposure settings before a field of view of the image sensor reaches the future scene.

3. The method of claim 1, further comprising identifying the second portion of the current image to use for determining the one or more future exposure settings comprises excluding a region of the current image from being used for determining the one or more future exposure settings.

4. The method of claim 1, wherein the one or more motion characteristics comprise one or more of a speed or a direction of travel of the image sensor.

5. The method of claim 4, further comprising:
    determining the one or more motion characteristics based at least in part on one or more of an inertial sensor or input to a steering system in communication with the image sensor.

6. The method of claim 1, wherein determining the one or more future exposure settings based on the determined second portion of the current image comprises:
    determining one or more regions of interest of the future image in the determined second portion; and
    adjusting exposure settings for the one or more regions of interest.

7. The method of claim 1, further comprising:
    determining a grid comprising one or more grid elements associated with one or more regions of the future image in the determined second portion; and
    determining weights for the one or more grid elements, wherein the one or more future exposure settings are based on the weights.

8. The method of claim 1, wherein the one or more future exposure settings include a variation in one or more current exposure settings of the current image.

9. The method of claim 1, further comprising:
    capturing the future image by the image sensor, based on the one or more future exposure settings.

10. The method of claim 1, further comprising predicting a location of the second portion of the current image based on the one or more motion characteristics of the image sensor.

11. The method of claim 1, wherein the object associated with a route of travel includes at least one indicium indicative of at least one characteristic of a road associated with the route of travel.

12. The method of claim 1, further comprising:
    detecting the object based on utilization of a graphics processing unit.

13. The method of claim 12, further comprising identifying, by the graphics processing unit, the object to be a road marker indicative of at least one turn, in a direction of travel, of a road associated with the route of travel.

14. The method of claim 13, wherein the road marker includes an arrow indicative of the at least one turn.

15. The method of claim 1, further comprising determining a location of the apparatus.

16. The method of claim 1, further comprising determining, based on a navigation service utilized by the apparatus, a location of the apparatus.

17. An apparatus for processing one or more images, the apparatus comprising:
    a memory configured to store the one or more images; and
    at least one processor implemented in circuitry and configured to:
        determine one or more current exposure settings for a current image of a current scene at a current time;
        process the current image using the one or more current exposure settings;
        determine, during travel of an apparatus to a destination, one or more motion characteristics associated with an image sensor of the apparatus;
        detect an object in a first portion of the current image, the object being associated with a route of travel of the apparatus to the destination, the object associated with the route of travel and the one or more motion characteristics being different;
        determine, based on the one or more motion characteristics and the object associated with the route of travel of the apparatus to the destination, a second portion of the current image to use for determining one or more future exposure settings for the image sensor, the one or more future exposure settings for capturing a future image of a future scene at a future time, the future time being subsequent to the current time; and
        determine the one or more future exposure settings based on the determined second portion of the current image.

18. The apparatus of claim 17, wherein the at least one processor is further configured to:
    determine the one or more future exposure settings before a field of view of the image sensor reaches the future scene.
19. The apparatus of claim 17, wherein the at least one processor is further configured to exclude a region of the current image from being used for determination of the one or more future exposure settings.
20. The apparatus of claim 17, wherein the one or more motion characteristics comprise one or more of a speed or a direction of travel of the image sensor.
21. The apparatus of claim 17, wherein the at least one processor is further configured to:
    determine the one or more motion characteristics based at least in part on one or more of an inertial sensor or input to a steering system in communication with the image sensor.
22. The apparatus of claim 17, wherein the at least one processor is further configured to:
    determine one or more regions of interest of the future image in the determined second portion; and
    adjust exposure settings for the one or more regions of interest.
23. The apparatus of claim 17, wherein the at least one processor is further configured to:
    determine a grid comprising one or more grid elements associated with one or more regions of the future image in the determined second portion; and
    determine weights for the one or more grid elements, wherein the one or more future exposure settings are based on the weights.
24. The apparatus of claim 17, wherein the one or more future exposure settings include a variation in one or more current exposure settings of the current image.
25. The apparatus of claim 17, wherein the at least one processor is further configured to:
    capture the future image by the image sensor, based on the one or more future exposure settings.
26. The apparatus of claim 17, further comprising a camera for capturing one or more images.
27. The apparatus of claim 17, wherein the apparatus comprises a mobile device with a camera for capturing one or more images or a vehicle with a camera for capturing one or more images.
28. The apparatus of claim 17, further comprising a display for displaying one or more images.
29. The apparatus of claim 17, wherein the at least one processor is further configured to predict a location of the second portion of the current image based on the one or more motion characteristics of the image sensor.
30. The apparatus of claim 17, wherein the object associated with a route of travel includes at least one indicium indicative of at least one characteristic of a road associated with the route of travel.
31. The apparatus of claim 17, wherein the at least one processor comprises a graphics processing unit configured to detect the object.
32. The apparatus of claim 31, wherein the graphics processing unit is configured to identify the object to be a road marker indicative of at least one turn, in a direction of travel, of a road associated with the route of travel.
33. The apparatus of claim 32, wherein the road marker includes an arrow indicative of the at least one turn.
34. The apparatus of claim 17, wherein the at least one processor is further configured to determine a location of the apparatus.
35. The apparatus of claim 17, wherein the at least one processor is further configured to determine, based on a navigation service utilized by the apparatus, a location of the apparatus.
36. A non-transitory computer-readable medium having stored thereon instructions that, when executed by one or more processors, cause the one or more processors to:
    determine one or more current exposure settings for a current image of a current scene at a current time;
    process the current image using the one or more current exposure settings;
    determine, during travel of an apparatus to a destination, one or more motion characteristics associated with an image sensor of the apparatus;
    detect an object in a first portion of the current image, the object being associated with a route of travel of the apparatus to the destination, the object associated with the route of travel and the one or more motion characteristics being different;
    determine, based on the one or more motion characteristics and the object associated with the route of travel of the apparatus to the destination, a second portion of the current image to use for determining one or more future exposure settings for the image sensor, the one or more future exposure settings for capturing a future image of a future scene at a future time, the future time being subsequent to the current time; and
    determine the one or more future exposure settings based on the determined second portion of the current image.
37. The non-transitory computer-readable medium of claim 36, further comprising instructions that, when executed by the one or more processors, cause the one or more processor to:
    determine the one or more future exposure settings before a field of view of the image sensor reaches the future scene.
38. The non-transitory computer-readable medium of claim 36, wherein determining the second portion of the current image to use for determining the one or more future exposure settings comprises excluding a region of the current image from being used for determining the one or more future exposure settings.
39. The non-transitory computer-readable medium of claim 36, further comprising instructions that, when executed by the one or more processors, cause the one or more processor to:
    determine the one or more motion characteristics based at least in part on one or more of an inertial sensor or input to a steering system in communication with the image sensor.
40. The non-transitory computer-readable medium of claim 36, further comprising instructions that, when executed by the one or more processors, cause the one or more processor to:
    determine the one or more motion characteristics based at least in part on input to a steering system in communication with the image sensor.
41. An apparatus for processing one or more images, the apparatus comprising:
    means for determining one or more current exposure settings for a current image of a current scene at a current time;
    means for processing the current image using the one or more current exposure settings;
    means for determining, during travel of an apparatus to a destination, one or more motion characteristics associated with an image sensor of the apparatus;

means for detecting an object in a first portion of the current image, the object being associated with a route of travel of the apparatus to the destination, the object associated with the route of travel and the one or more motion characteristics being different;

means for determining, based on the one or more motion characteristics and the object associated with the route of travel of the apparatus to the destination, a second portion of the current image to use for determining one or more future exposure settings for the image sensor, the one or more future exposure settings for capturing a future image of a future scene at a future time, the future time being subsequent to the current time; and means for determining the one or more future exposure settings based on the determined second portion of the current image.

42. The apparatus of claim 41, wherein the means for determining the second portion of the current image to use for determining the one or more future exposure settings comprises means for excluding a region of the current image from being used for determining the one or more future exposure settings.

\* \* \* \* \*